(12) United States Patent
Franconi

(10) Patent No.: US 8,011,382 B2
(45) Date of Patent: Sep. 6, 2011

(54) BI-MODAL BLEED VALVE ASSEMBLY FOR GAS TURBINE ENGINE

(75) Inventor: Robert B. Franconi, New Hartford, CT (US)

(73) Assignee: Honeywell International Inc., Morristown, NJ (US)

( * ) Notice: Subject to any disclaimer, the term of this patent is extended or adjusted under 35 U.S.C. 154(b) by 577 days.

(21) Appl. No.: 12/246,159

(22) Filed: Oct. 6, 2008

(65) Prior Publication Data

US 2010/0083667 A1    Apr. 8, 2010

(51) Int. Cl.
*F16K 31/124* (2006.01)

(52) U.S. Cl. ............ 137/489.5; 137/488; 137/485; 137/495; 251/28; 251/63; 251/63.5

(58) Field of Classification Search .......... 137/485–489, 137/489.5, 494, 495; 251/28, 62, 63, 63.5, 251/63.6; 60/795; 415/27
See application file for complete search history.

(56) References Cited

U.S. PATENT DOCUMENTS

| | | | |
|---|---|---|---|
| 3,595,263 A * | 7/1971 | Greenlaw | 251/28 |
| 4,251,985 A | 2/1981 | Sullivan | |
| 4,574,585 A * | 3/1986 | Conn | 60/795 |
| 4,639,196 A * | 1/1987 | Kirkland, Jr. | 251/63.5 |
| 5,313,778 A | 5/1994 | Sweet et al. | |
| 2007/0241297 A1 | 10/2007 | Tanner et al. | |

FOREIGN PATENT DOCUMENTS

EP    0137614 A2    4/1985

\* cited by examiner

*Primary Examiner* — Kevin Lee
(74) *Attorney, Agent, or Firm* — Ingrassia Fisher & Lorenz, P.C.

(57) ABSTRACT

A bi-modal bleed valve assembly is provided. In one embodiment, the bi-modal bleed valve assembly includes a housing assembly having a bleed inlet, a bleed outlet, a control servo port, and a control chamber therein. A main flow control valve is fluidly coupled to the control chamber and configured to move between an open position and a closed position to regulate fluid flow from the bleed inlet to the bleed outlet. The main flow control valve is configured to move from an open position to a closed position when the pressure within the control chamber surpasses a predetermined threshold. A switching valve is fluidly coupled between the bleed inlet, the servo control port, and the control chamber. The switching valve is configured to route fluid flow into the control chamber from: (i) the bleed inlet in an autonomous mode, and (ii) the servo control port in a servo-controlled mode.

20 Claims, 6 Drawing Sheets

BI-MODAL BLEED VALVE ASSEMBLY FOR GAS TURBINE ENGINE

TECHNICAL FIELD

The present invention relates generally to pressure regulating systems and, more particularly, to a bi-modal bleed valve assembly suitable for regulating the air pressure within the compressor of a gas turbine engine of the type commonly deployed on an aircraft.

BACKGROUND

The compressor section of a gas turbine engine (GTE) may include one or more turbines, which may each include multiple bladed discs dividing the compressor section into a number of compressor stages. The compressor section of a three spool turbofan jet engine, for example, may include an intermediate turbine and a high pressure turbine disposed in axial flow series. The intermediate pressure turbine is supported by a first spool, which is rotatably mounted within the GTE housing. Similarly, the high pressure turbine is supported by a second spool, which is rotatably mounted within the GTE housing and which extends through a longitudinal channel provided through the first spool. During operation of the GTE, the first and second spools, and therefore the intermediate and high pressure turbines, rotate to compress air received from an intake section of the GTE. The compressed air then flows into a combustion section of the GTE wherein the air is mixed with fuel and ignited to further drive the rotation of the spools and to produce forward thrust.

To ensure optimal operation of a GTE, it is generally desirable to minimize starting torque and/or eliminate any pressure surges that may occur within the GTE's compressor due to, for example, abrupt changes in power level. Thus, to regulate or stabilize the pressure within the GTE compressor, a bleed valve assembly may be fluidly coupled between a stage of the compressor and a plenum (e.g., a protected zone surrounding the GTE). When in an open position, the bleed valve assembly vents pressurized air to the plenum to reduce the pressure within the GTE compressor. When in a closed position, the bleed valve assembly prevents pressurized airflow to the plenum thus permitting the pressure within the GTE compressor to accumulate. The bleed valve assembly may be pneumatically controlled by an electro-pneumatic servo control valve, which is, in turn, electrically controlled by an engine controller. During operation, the engine controller may send command signals to the servo control valve to vary the pressure of a control fluid (e.g., pressurized air) supplied to the bleed valve assembly to move the bleed valve assembly between open and closed positions and, thus, to vent the GTE compressor to the plenum as needed to maintain the compressor pressure within a desired range.

Servo-controlled bleed valve assemblies of the type described above are well-suited for use in conjunction with certain GTE platforms, such as those experiencing large surge margins and power level shifts during operation. However, in other GTE platforms, passive regulation of the GTE compressor is sufficient. In this latter group of GTE platforms, the utilization of a servo-controlled bleed valve assembly and its associated hardware (e.g., servo control valve, plumbing, etc.) adds unnecessary weight, cost, and complexity to the gas turbine engine.

Accordingly, it is desirable to provide a bleed valve assembly operable in either: (i) a servo-controlled mode wherein the bleed valve assembly regulates the pressure of a GTE compressor in accordance with commands received from a servo control valve or other such external controller, or (ii) an autonomous mode wherein the bleed valve assembly regulates the pressure of a GTE compressor independently and thus eliminates the need for an external control system. Preferably, embodiments of such a bi-modal bleed valve assembly would permit a user to select between the servo-controlled mode and the autonomous mode in a relatively simple and intuitive manner. Other desirable features and characteristics of the present invention will become apparent from the subsequent Detailed Description and the appended claims, taken in conjunction with the accompanying drawings and this Background.

BRIEF SUMMARY

A bi-modal bleed valve assembly is provided. In one embodiment, the bi-modal bleed valve assembly includes a housing assembly having a bleed inlet, a bleed outlet, a control servo port, and a control chamber therein. A main flow control valve is fluidly coupled to the control chamber and configured to move between an open position and a closed position to regulate fluid flow from the bleed inlet to the bleed outlet. The main flow control valve is configured to move from an open position to a closed position when the pressure within the control chamber surpasses a predetermined threshold. A switching valve is fluidly coupled between the bleed inlet, the servo control port, and the control chamber. The switching valve is configured to route fluid flow into the control chamber from: (i) the bleed inlet in an autonomous mode, and (ii) the servo control port in a servo-controlled mode.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
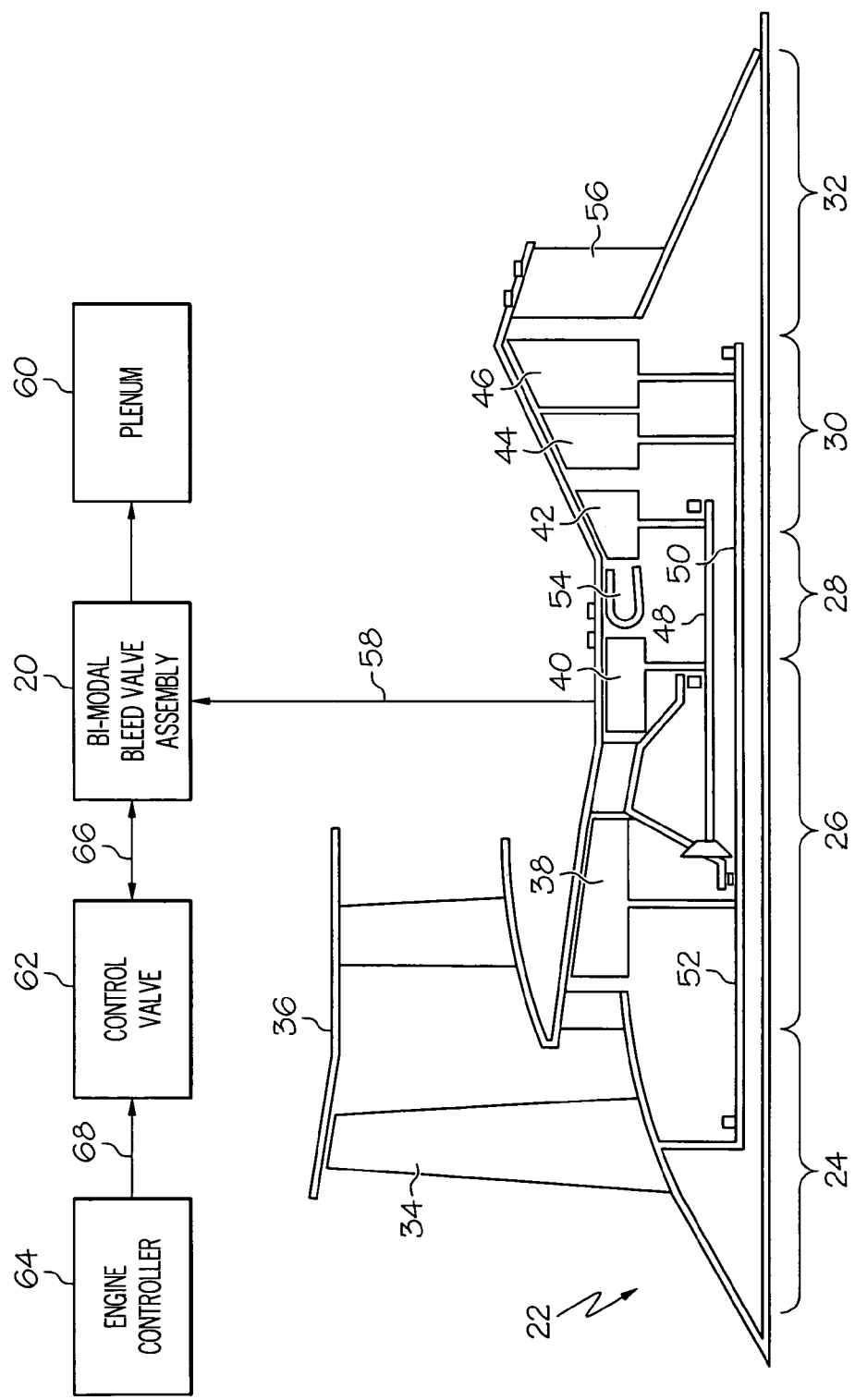
FIG. 1 is schematic of a bi-modal bleed valve assembly utilized in conjunction with a gas turbine engine, an engine controller, and a servo control valve in accordance with an exemplary embodiment.

FIG. 1 is a functional schematic of a bi-modal bleed valve assembly 20 in accordance with an exemplary embodiment of the present invention. Bi-modal bleed valve assembly 20 is especially well suited for regulating the air pressure within the compressor of a gas turbine engine of the type commonly deployed on an aircraft. For this reason, bi-modal bleed valve assembly 20 is illustrated in FIG. 1 and described below in conjunction with an exemplary gas turbine engine (GTE) 22. This example notwithstanding, it will be appreciated that embodiments of the bi-modal bleed valve assembly may be utilized in alternative types of applications to regulate the pressure of various other fluids.

Figure 2:
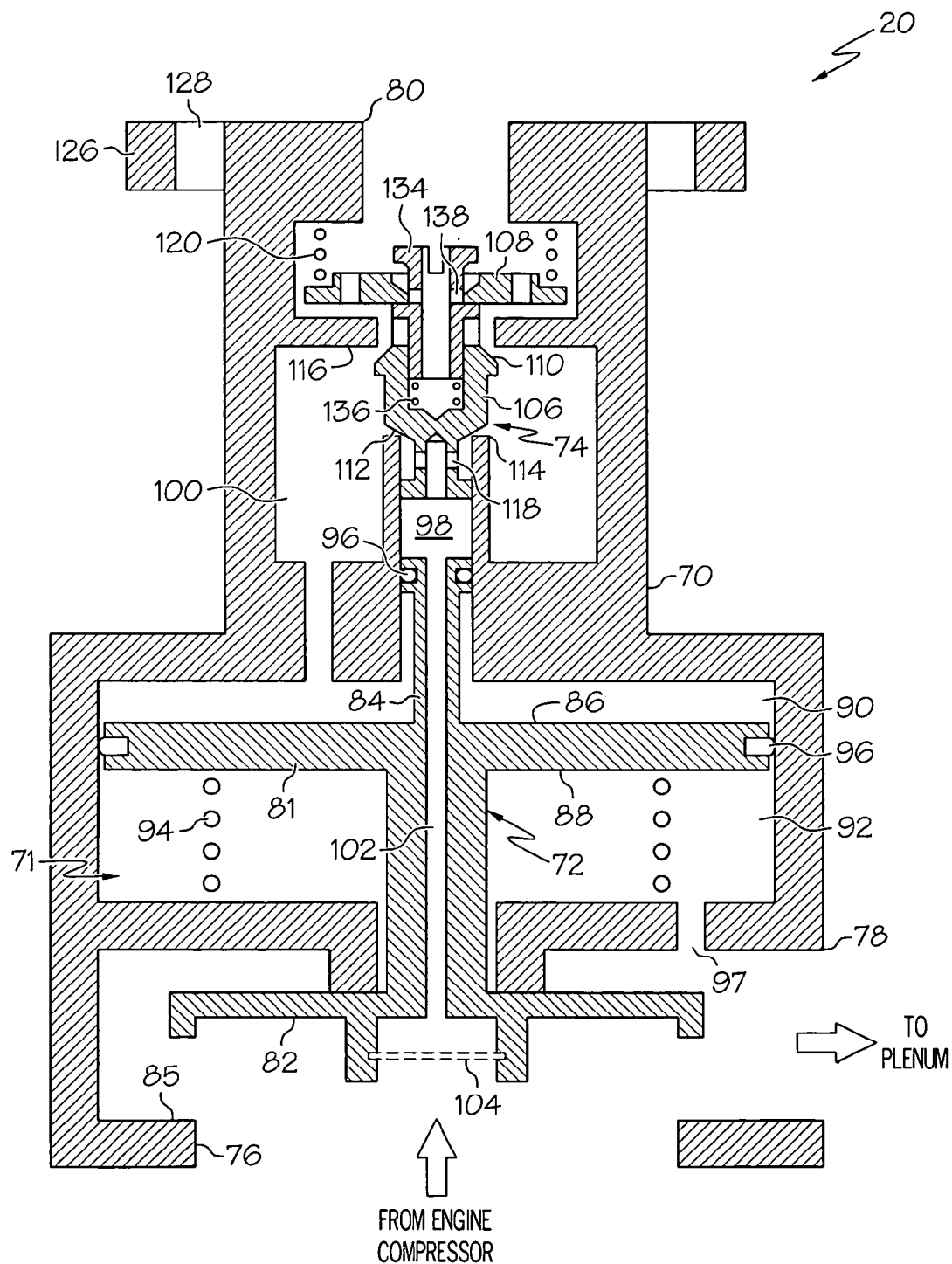
FIGS. 2 and 3 are simplified cross-sectional views of the exemplary bi-modal bleed valve assembly shown in FIG. 1 in an autonomous operational mode and in open and closed positions, respectively.

In exemplary embodiment illustrated in FIGS. 1 and 2, GTE 22 assumes the form of a three spool turbofan engine including an intake section 24, a compressor section 26, a combustion section 28, a turbine section 30, and an exhaust section 32. Intake section 24 includes a fan 34 mounted in a fan case 36. Compressor section 26 includes one or more compressors (e.g., an intermediate pressure (IP) compressor 38 and a high pressure (HP) compressor 40), and turbine section 30 includes one or more turbines (e.g., an HP turbine 42, an IP turbine 44, and a low pressure (LP) turbine 46), which may be disposed in axial flow series. HP compressor 40 and HP turbine 42 are mounted on opposing ends of an HP shaft or spool 48; IP compressor 38 and IP turbine 44 are mounted on opposing ends of IP spool 50; and fan 34 and LP turbine 46 are mounted on opposing ends of a LP spool 52. LP spool 52, IP spool 50, and HP spool 48 are substantially co-axial. That is, LP spool 52 may extend through a longitudinal channel provided through IP spool 50, and IP spool 50 may extend through a longitudinal channel provided through HP spool 48. Although not shown in FIG. 1 for clarity, GTE 22 may further include an additional fan drive shaft.

During operation of gas turbine engine 22, air is drawn into intake section 24 and accelerated by fan 34. A portion of the accelerated air is directed through a bypass section (not shown) disposed between fan case 36 and an engine cowl (also not shown) to provide forward thrust. The remaining portion of air exhausted from fan 34 is directed into compressor section 26 and compressed by IP compressor 38 and HP compressor 40. The compressed air then flows into combustion section 28 wherein the air is mixed with fuel and combusted by a plurality of combustors 54 (only one of which is shown in FIG. 1). The combusted air expands rapidly and flows through turbine section 30 thereby rotating turbines 42, 44, and 46. The rotation of turbines 42, 44, and 46 (and, therefore, of spools 48, 50, and 52) drives the rotation of HP compressor 40, IP compressor 38, and fan 34, respectively. Finally, after passing through turbine section 30, the air is exhausted through an exhaust nozzle 56 mounted in exhaust section 32 to provide addition forward thrust.

Bi-modal bleed valve assembly 20 is fluidly coupled between compressor section 26 and a low pressure source. For example, and as indicated in FIG. 1 by arrows 58, bi-modal bleed valve assembly 20 may be fluidly coupled between a stage of HP compressor 40 and a plenum 60 (e.g., a protected zone provided around GTE 22). Bi-modal bleed valve assembly 20 functions to regulate the air pressure within HP compressor 40 by selectively venting pressurized air from HP compressor 40 to plenum 60. As a point of emphasis, bi-modal bleed valve assembly 20 is operable in at least two modes: (i) an autonomous mode, and (ii) a servo-controlled mode. In the autonomous mode, bi-modal bleed valve assembly 20 regulates the air pressure within HP compressor 40 independently (i.e., without the need for external control) as a function of compressor pressure and, preferably, as a function of the pressure differential between the pressures appearing at the inlet and the outlet of valve assembly 20. By comparison, in the servo-controlled mode, bi-modal bleed valve assembly 20 selectively vents pressurized air from HP compressor 40 to plenum 60 in accordance with commands received from an external control system. For example, and as indicated in FIG. 1 by double-headed arrow 66, bi-modal bleed valve assembly 20 may be coupled to a control valve 62 for bi-directional fluid communication therewith. Control valve 62 may, in turn, be operatively coupled to an engine controller 64 as indicated in FIG. 1 by arrow 68. In a preferred embodiment, control valve 62 and engine controller 64 may comprise an electro-pneumatic controller and a full authority digital engine controller (commonly referred to by the acronym "FADE"), respectively. During operation, engine controller 64 sends electrical signals to control valve 62 to increase or decrease the pressure of a control fluid (e.g., pressurized air) supplied to bi-modal bleed valve assembly 20 to move valve assembly 20 between an open and closed positions. Engine controller 64 may monitor various operative parameters of GTE 22 (e.g., the pressure within compressor section 26, power level settings, etc.) and command control valve 62 to open and close bi-modal bleed valve assembly 20 to selectively vent HP compressor 40 and thereby regulate the air pressure therein.

Each operative mode of bi-modal bleed valve assembly 20 presents certain advantages. For example, in the autonomous mode, bi-modal bleed valve assembly 20 operates independently and thus eliminates the need for external hardware (e.g., control valve 62, ducting, etc.) that would otherwise be required to provide remote control of valve assembly 20. By comparison, in the servo-controlled mode, an external controller (e.g., engine controller 64) may command bi-modal bleed valve assembly 20 to open or close under a chosen set of criteria. In addition, in the servo-controlled mode, bi-modal bleed valve assembly 20 transitions from the open position to the closed position in an extremely rapid manner. A user may choose a particular operational mode for bi-modal bleed valve assembly 20 based upon performance characteristics (e.g., surge margin, power level rate of change, etc.) of the host GTE. Preferably, and as described more fully below in conjunction with FIGS. 2-6, bi-modal bleed valve assembly 20 normally resides in the autonomous mode and transitions to the servo-controlled mode upon receipt of a fitting (or other such connector) utilized to fluidly couple valve assembly 20 to a servo control valve, such as servo control valve 62 shown in FIG. 1.

Figure 3:
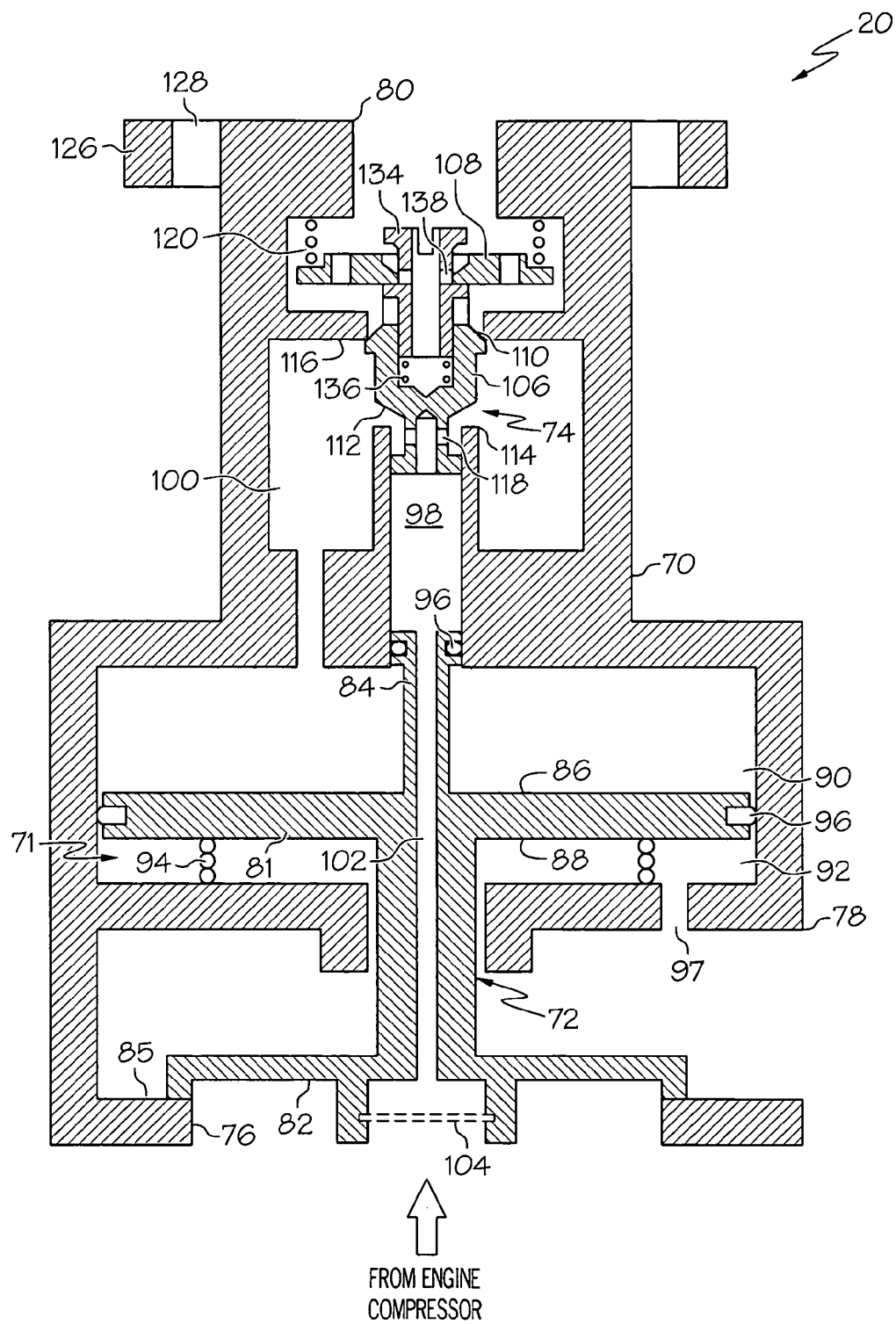

FIGS. 2 and 3 are simplified cross-sectional views of exemplary bi-modal bleed valve assembly 20 in an autonomous operational mode and in open and closed positions, respectively. In the exemplary embodiment illustrated in FIGS. 2 and 3, bleed valve assembly 20 includes housing assembly 70, a main flow control valve 71, and a switching valve 74. Although illustrated as a unitary body in FIG. 1, housing assembly 70 may include multiple housing structures, which may or may not be rigidly joined together; e.g., housing assembly 70 may include a first housing structure in which main flow control valve 71 is disposed and a second housing structure in which switching valve 74 is disposed and to which the first housing structure is fluidly coupled via one or more conduits.

Housing assembly 70 includes a bleed inlet 76, a bleed outlet 78, a control servo port 80, a primary or control chamber 90, and a secondary chamber 92 therein. Bleed inlet 76 is conveniently fluidly coupled to the compressor of a gas turbine engine, such as HP compressor 40 of GTE 22 shown in FIG. 1. Bleed outlet 78 is conveniently coupled to a low pressure source, such as plenum 60 shown in FIG. 1. Lastly, control servo port 80 is configured to be optionally fluidly coupled servo control valve 62 (or other such servo control device) shown in FIG. 1. Notably, control servo port 80 is only fluidly coupled to servo control valve 62 when operating in the servo-controlled mode. Control servo port 80 may be fluidly coupled to servo control valve 62 utilizing a fitting that is inserted into control servo port 80 as described more fully below in conjunction with FIGS. 5 and 6. However, when operating in the autonomous mode illustrated in FIGS. 2 and 3, control servo port 80 is not fluidly coupled to servo control valve 62. In this case, control servo port 80 may be vented to a low pressure source, such as ambient or plenum 60.

Main flow control valve 71 is mounted within housing assembly 70 for movement between: (i) an open position wherein main flow control valve 71 substantially permits pressurized airflow from bleed inlet 76 to bleed outlet 78, and (ii) a closed position wherein main flow control valve 71 substantially prevents pressurized airflow from bleed inlet 76 to bleed outlet 78. Main flow control valve 71 is configured to normally reside in the open position and transition to the closed position when the pressure within control chamber 90 exceeds a predetermined pressure threshold. As utilized herein, the term "predetermined pressure threshold" is defined broadly to include a pressure differential between two selected pressures, such as the pressure differential between the pressure within control chamber 90 and the pressure appearing at bleed outlet 78 (e.g., the pressure of plenum 60). Main flow control valve 71 may assume the form of any valve assembly (e.g., a butterfly valve assembly) suitable for performing these functions. However, in a preferred embodiment, main flow control valve 71 assumes the form of a translating poppet-type valve as described below.

In the exemplary embodiment illustrated in FIGS. 2 and 3, main flow control valve 71 comprises a piston 72 slidably mounted within housing assembly 70 for movement between an open position (shown in FIG. 2) and a closed position (shown in FIG. 3). Piston 72 includes a radial flange 81, a poppet head 82, and a guide stem 84, which may be integrally formed as a single machined piece. When piston 72 is in the open position (i.e., the upper translational position shown in FIG. 2), poppet head 82 seats on an inner wall of housing assembly 70. In this position, pressurized air is permitted to flow from bleed inlet 76 to bleed outlet 78, and therefore from HP compressor 40 (FIG. 1) to plenum 60 (FIG. 1), with little resistance. However, when piston 72 descends into the closed position shown in FIG. 3, poppet head 82 seats on the inner surface of a lower wall 85 of housing assembly 70. In this position, poppet head 82 generally blocks the pressurized airflow from bleed inlet 76 to bleed outlet 78 thus generally preventing pressurized airflow from HP compressor 40 (FIG. 1) to plenum 60.

As shown in FIGS. 2 and 3, radial flange 81 of piston 72 includes first and second opposing faces 86 and 88. Piston 72, and specifically radial flange 81, cooperates with housing assembly 70 to define control chamber 90 and secondary chamber 92. A piston spring 94 is disposed within secondary chamber 92. Piston spring 94 is compressed between an inner wall of housing assembly 70 and face 88 of radial flange 81 and consequently biases piston 72 toward the open position (FIG. 2). The pressurized air within control chamber 90 acts on radial face 86 of flange 81 in opposition to spring 94 and the force exerted on the face of poppet head 82 by pressurized airflow through bleed inlet 76. When the force exerted on flange 81 by the pressurized air within control chamber 90 exceeds the cumulative force exerted on flange 81 by piston spring 94 and the force exerted on the exposed area of poppet head 82, piston 72 descends into the closed position to block pressurized fluid flow from bleed inlet 76 to bleed outlet 78. To decrease the leakage of pressurized air between the various chambers within housing assembly 70, piston 72 may carry two dynamic seals 96 (e.g., filled polymer, carbon, or metallic seals). Furthermore, to facilitate the movement of piston 72, secondary chamber 92 may be vented to bleed outlet 78 as generally shown in FIGS. 2 and 3 at 97.

An intermediate compartment 98 is further provided within housing assembly 70 and fluidly coupled to control chamber 90 via a flow passage 100. A longitudinal channel 102 is provided through piston 72 to permit fluid communication between bleed inlet 76 and intermediate compartment 98 and, therefore, control chamber 90. Longitudinal channel 102 permits pressurized airflow from bleed inlet 76 to intermediate compartment 98. The flow of pressurized air from intermediate compartment 98 through flow passage 100 and to control chamber 90 is then regulated by switching valve 74 in the manner described below. If desired, one or more screens may be mounted to piston 72 to filter airflow through channel 102. For example, and as shown in FIGS. 2 and 3, a screen 104 may be mounted to piston 72 proximate the mouth of channel 102.

In the illustrated exemplary embodiment, switching valve 74 assumes the form of a poppet-type valve disposed adjacent servo inlet port 80. Switching valve 74 includes a main body 106 having a radial flange 108, a first seating surface 110, and a second seating surface 112. First and second seating surfaces 110 and 112 may assume any suitable geometry; however, as indicated in FIGS. 2 and 3, first and second seating surfaces 110 and 112 each preferably have a generally conical geometric shape to provide consistent sealing despite wear that may occur over the operational life of bi-modal bleed valve assembly 20. Switching valve 74 is disposed within housing assembly 70 for movement between a first seated position (shown in FIG. 2) and a second seated position (shown in FIG. 3). In the first seated position (FIG. 2), seating surface 112 of main body 106 sealingly engages a first inner wall 114 of housing assembly 70 proximate the outlet of intermediate compartment 98. In so doing, main body 106 of switching valve 74 substantially prevents pressurized airflow from intermediate compartment 98 through flow passage 100 and to control chamber 90. In the second seated position, seating surface 110 of main body 106 sealingly engages a second inner wall 116 of housing assembly 70. In this position, switching valve 74 moves upward and airflow is permitted to flow through a plurality of through-holes 118 provided through main body 106. Consequently, when switching valve 74 is in the second seated position (FIG. 3), pressurized air may flow from intermediate compartment 98 through flow passage 100 to control chamber 90 wherein the pressurized air may act on flange 81 of piston 72. Also, in the second seated position, main body 106 of switching valve 74 prevents fluid communication between control servo port 80 and the interior of housing assembly 70 (e.g., flow passage 100, control chamber 90, piston 72, etc.). A spring 120 is disposed within housing assembly 70 and engages flange 108 to bias switching valve 74 toward the first seated position (FIG. 2).

Figure 4:
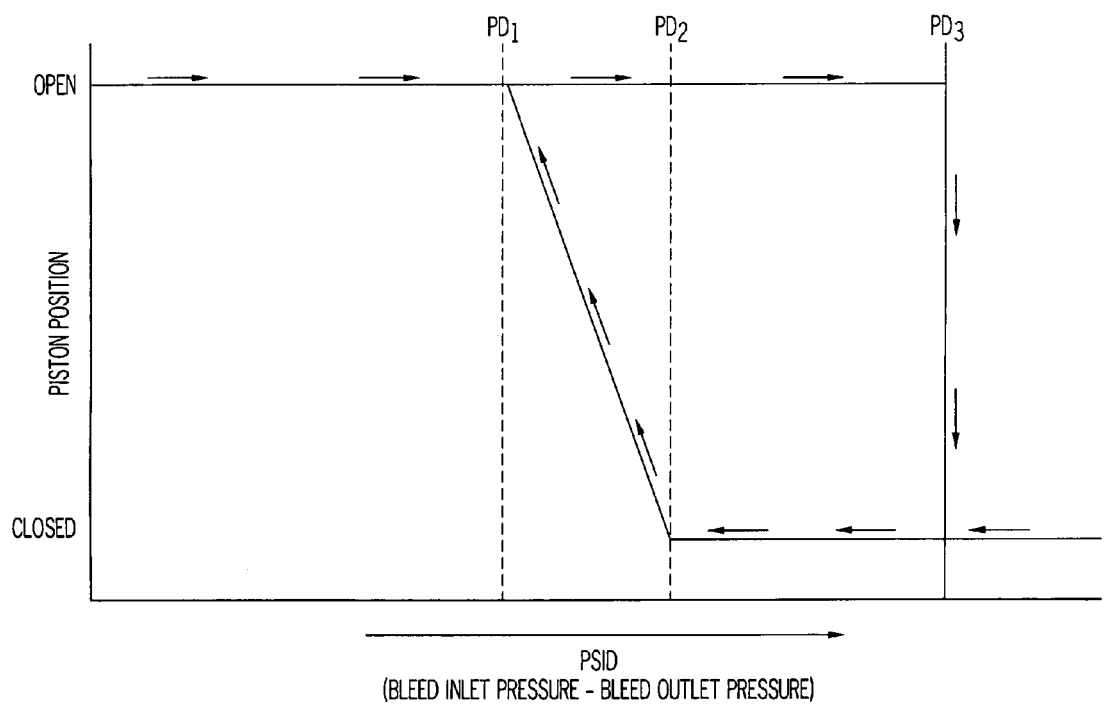
FIG. 4 is a graph of piston position (vertical axis) versus bleed inlet/outlet pressure differential (horizontal axis) illustrating one manner in which the piston of the bi-modal bleed valve assembly may be configured to transition between the open position and the closed position in the autonomous operational mode.

The operation of bi-modal bleed valve assembly 20, when in the autonomous operational mode, will now be described in conjunction with FIGS. 2-4. Referring initially to FIG. 2, bi-modal bleed valve assembly 20 is illustrated when the difference between the air pressure appearing at bleed inlet 76 and that appearing at bleed outlet 78 (e.g., the pressure of plenum 60) is below an upper predetermined bleed inlet/outlet pressure differential ($PD_3$). At this juncture, pressurized air flows through longitudinal channel 102 and acts on the exposed face of switching valve 74. However, below the upper predetermined bleed inlet/outlet pressure differential ($PD_3$), the force exerted on main body 106 of switching valve 74 is insufficient to overcome the force exerted on main body 106 by spring 120. Switching valve 74 thus remains in the first position (FIG. 2) and blocks airflow from intermediate compartment 98 to flow passage 100 and, more generally, from bleed inlet 76 to control chamber 90. The force exerted on radial face 86 of piston 72 by the air within control chamber 90 is consequently less than the cumulative force exerted on piston 72 by spring 94 and the air within chamber 92. As a result, piston 72 is maintained in the open position, and pressurized air is permitted to flow from bleed inlet 76 to bleed outlet 78 with little to no impedance.

Referring now to FIG. 3, bi-modal bleed valve assembly 20 is illustrated when the air pressure received at bleed inlet 76 is above the upper predetermined bleed inlet/outlet pressure differential ($PD_3$). Again, pressurized air flows from bleed inlet 76, through longitudinal channel 102, and into intermediate compartment 98 and acts on the exposed face of switching valve 74. The force exerted on main body 106 of switching valve 74 by the pressurized air within intermediate compartment 98 now exceeds the force exerted on main body 106 by spring 120, and main body 106 moves from the first seated position (FIG. 2) into the second seated position (FIG. 3). This permits pressurized air to flow from intermediate compartment 98, through flow passage 100, and into control chamber 90 and act on radial face 86 of piston 72. The force exerted on piston 72 by the pressurized air within control chamber 90 exceeds the cumulative force exerted on piston 72 by spring 94, the pressurized air within chamber 92 acting on face 88 of flange 81, and the pressurized airflow through bleed inlet 76 acting on the face of poppet head 82. Piston 72 moves downward (in the orientation shown in FIGS. 2 and 3) into the closed position (FIG. 3), poppet head 82 sealing engages wall 85 of housing assembly 70. Pressurized airflow from bleed inlet 76 to bleed outlet 78 is thus prevented, and the pressure within GTE compressor 40 (FIG. 1) increases accordingly.

It can be seen in FIG. 3 that the surface area of radial face 86 of piston 72 is greater than the surface area of poppet head 82 exposed through bleed inlet 76 when piston 72 is in the closed position. As a result of this area differential, piston 72 will rapidly transition from the open position (FIG. 2) to the closed position (FIG. 3) when switching valve 74 moves into the second seated position (FIG. 3) and the pressurized air is permitted to flow into control chamber 90 from bleed inlet 76. Piston 72 will, however, return to the open position (FIG. 2) from the closed position (FIG. 3) more gradually over a lower predetermined bleed inlet/outlet pressure differential range ($PD_1$-$PD_2$). Further emphasizing this point, FIG. 4 is a graph illustrating the position of piston 72 (vertical axis) over a range of bleed inlet/outlet pressure differential values. As indicated in FIG. 4, when the air pressure appearing at bleed inlet 76 exceeds the air pressure appearing at bleed outlet 78 by the upper predetermined bleed inlet/outlet pressure differential ($PD_3$), piston 72 moves rapidly from the open position (FIG. 2) to the closed position (FIG. 3). It is only after the pressure differential decreases below a second low pressure differential threshold ($PD_2$), which is less than $PD_3$, that piston 72 begins to move gradually from closed position (FIG. 3) toward the open position (FIG. 2); and it is only after the pressure deferential has decreased below a third low pressure differential threshold ($PD_3$), which is less than the $PD_2$, that piston 72 moves fully into the closed position (FIG. 3). As a non-limiting example, $PD_1$ and $PD_2$ may each have a value between approximately 6.17 and approximately 7.52 pounds per square inch differential (PSID), and $PD_3$ may have a value between approximately 10.62 and 12.98 PSID. Of course, the pressure differentials at which main flow control valve 71 opens and closes, and the translational characteristics of main flow control valve 71 (e.g., the rate at which piston 72 transitions from the open position to the closed position or from the closed position to the open position), may be varied as desired by altering the geometries of piston 72 and switching valve 74 and by selecting different characteristics for spring 94 and/or for spring 120.

Figure 5:
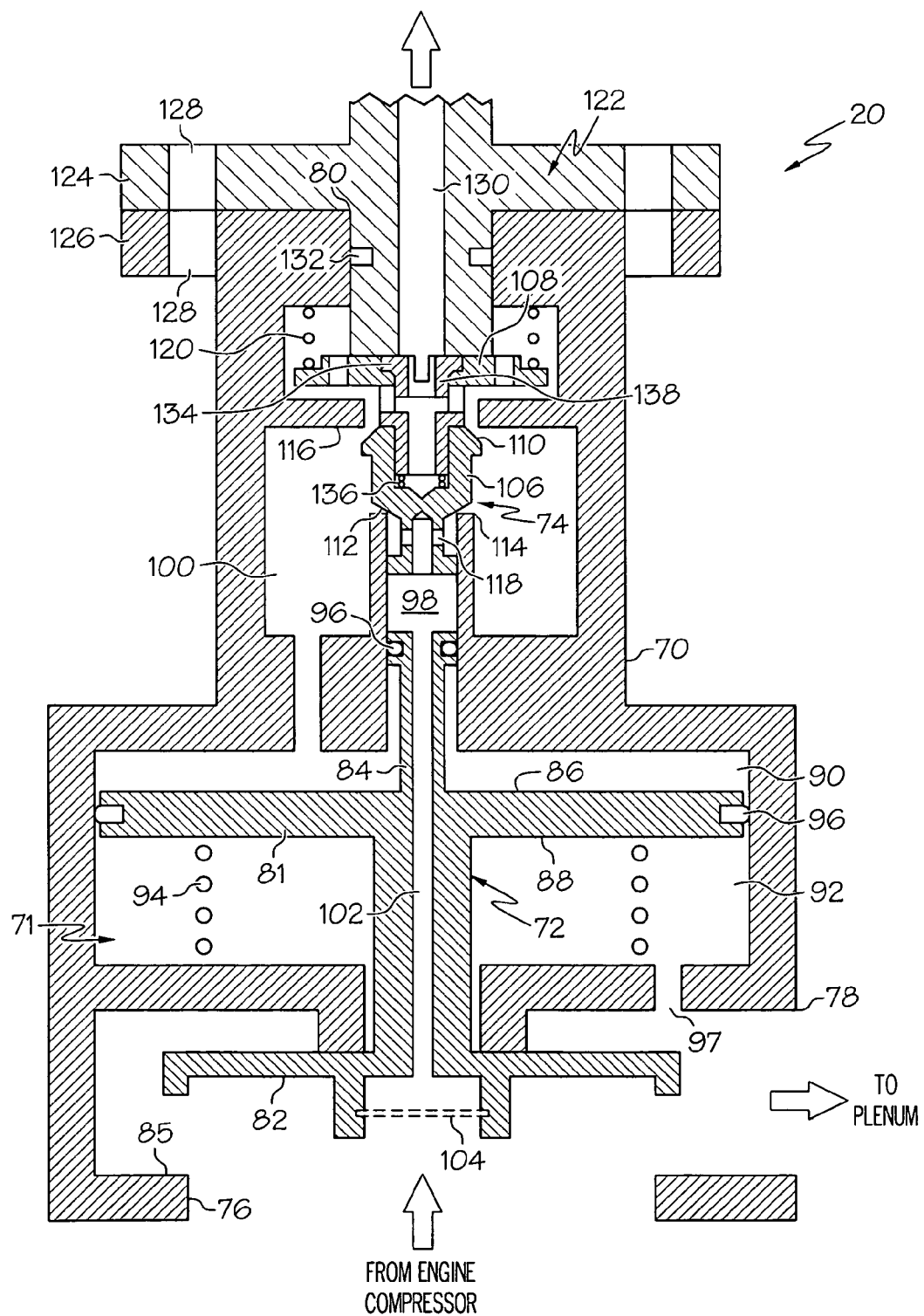
FIGS. 5 and 6 are simplified cross-sectional views of the exemplary bi-modal bleed valve assembly shown in FIG. 1 in a servo-controlled operational mode and in open and closed positions.
Figure 6:
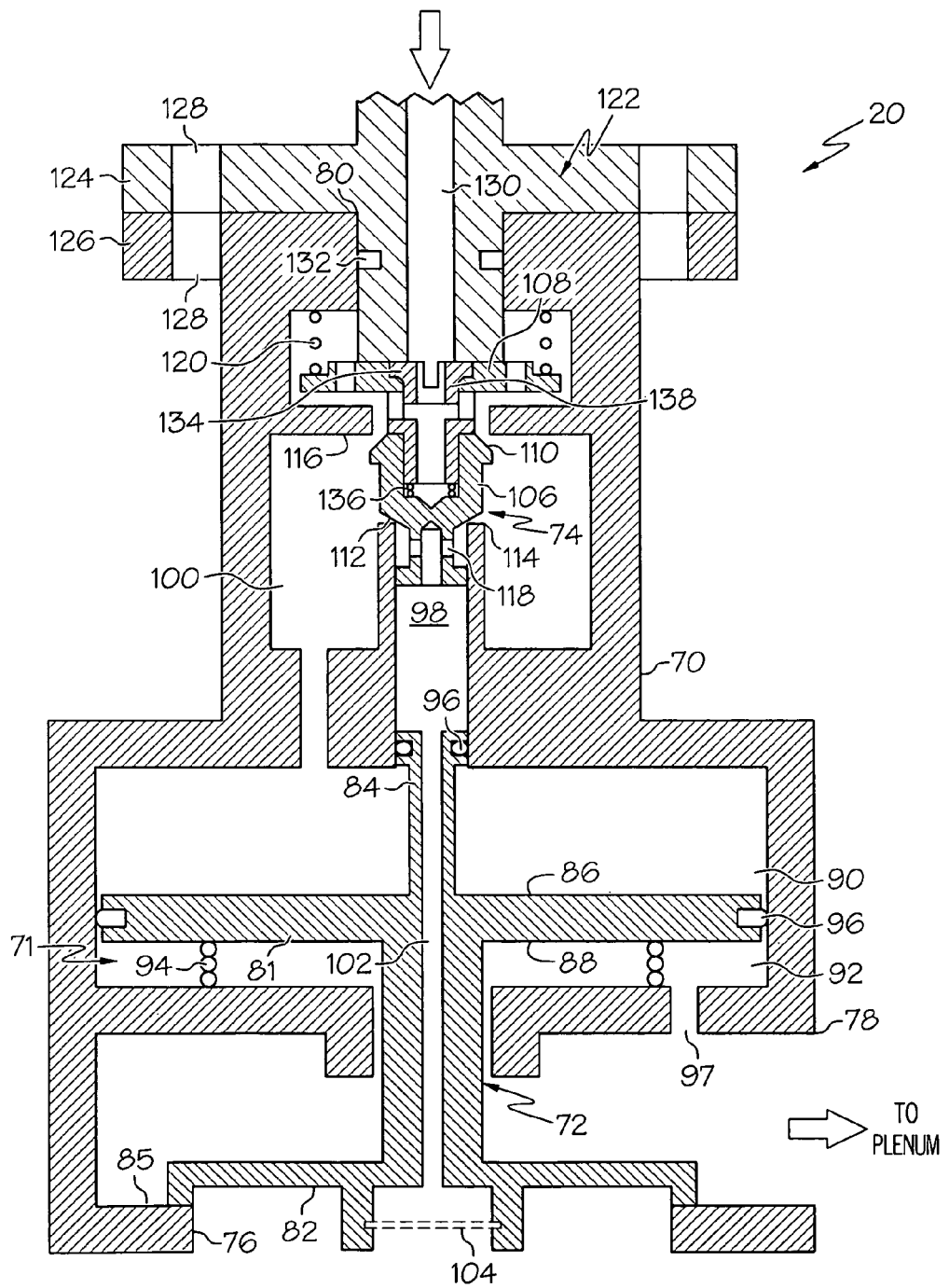

Turning now to FIGS. 5 and 6, bi-modal bleed valve assembly 20 is illustrated in a servo-controlled mode in open (FIG. 5) and closed (FIG. 6) positions. The servo-controlled mode of bi-modal bleed valve assembly 20 has been activated by the insertion of a fitting 122 into servo control inlet 80 of housing assembly 70. In this particular example, fitting 122 includes a first radial mounting flange 124 that abuts with a second radial mounting flange 126 incorporated into housing assembly 70. As indicated in FIGS. 5 and 6, mounting flanges 124 and 126 may each include a plurality of apertures 128 therethrough that align to receive a plurality of bolts or other such fasteners (not shown) to secure fitting 122 to housing assembly 70. Fitting 122 further includes a longitudinal flow passage 130 therethrough. When fitting 122 is inserted into servo control inlet 80, flow passage 130 permits fluid communication between a control device (e.g., servo control valve 62 shown in FIG. 1) and the interior of bi-modal bleed valve assembly 20 as described more fully below. To minimize fluid leakage, one or more seals may be disposed between an outer surface of fitting 122 and an inner surface of housing assembly 70 as generally shown in FIGS. 5 and 6 at 132.

When inserted into servo control inlet 80, fitting 122 physically engages switching valve 74 to secure switching valve 74 in the first seated position (shown in FIGS. 2, 5, and 6). Fitting 122 maintains switching valve 74 is in this position irregardless of the magnitude of the air pressure appearing at bleed inlet 76. In the servo-controlled mode, fitting 122 and switching valve 74 thus cooperate to prevent the pressurized air received at bleed inlet 76 from flowing into control chamber 90 and acting on radial face 86 of piston 72. Although by no means necessary, fitting 122 and/or switching valve 74 may be provided with a compliant element to increase tolerance. For example, switching valve 74 may be equipped with a resilient element that is compressed when fitting 122 is received within control servo port 80. In the illustrated exemplary embodiment, this resilient element assumes the form of a pin 134, which is slidably mounted to main body 106 of switching valve 74, and a spring 136, which biases pin 134 toward an extended position. As indicated in FIGS. 5 and 6, when fitting 122 is inserted into servo control inlet 80, fitting 122 contacts pin 134 and compresses spring 136. Pin 134 and spring 136, in turn, contact main body 106 of switching valve 74 to maintain switching valve 74 is the first seated position (FIGS. 2, 5, and 6).

When in the first seated position (FIGS. 2, 5, 6), switching valve 74 provides a flow path from fitting 122 to flow passage 100 and, therefore, to control chamber 90. In the illustrated example, this flow path is defined by a longitudinal channel and a plurality of sidewall apertures provided through pin 134 as generally indicated in FIGS. 5 and 6 at 138; however, the flow path may be formed through other portions of switching valve 74 in alternative embodiments. By fluidly coupling fitting 122 to control chamber 90, switching valve 74 permits an external servo control valve (e.g., servo control valve 62 shown in FIG. 1) to control the translational position of piston 72. To cause piston 72 to move from the open position (FIG. 5) to the closed position (FIG. 6), the external servo control valve need only supply air (or other such control fluid) at relatively high pressure to bi-modal bleed valve assembly 20 via fitting 122. As explained above, the pressurized air will enter into control chamber 90 and exert a force on radial face 86 of piston 72 exceeding the cumulative force exerted on piston 72 by spring 94 and the air within chamber 92. Piston 72 will thus transition from the open position (FIG. 5) to the closed position (FIG. 6) in a relatively rapid manner. To cause piston 72 to return to the open position (FIG. 5) from the closed position (FIG. 6), the external servo control valve reduces the control pressure supplied to bi-modal bleed valve assembly 20 via fitting 122 by, for example, venting to a low pressure source, such as ambient or plenum 60 (FIG. 1). This results in a corresponding decrease in the air pressure within control chamber 90, and permits piston 72 to move into the open position (FIG. 5) under the bias force of spring 94 and the force exerted on poppet head 82 by airflow through bleed inlet 76. Thus, by varying the pressure of air supplied to bi-modal bleed valve assembly 20 by way of fitting 122, the servo control valve (e.g., servo control valve 62 shown in FIG. 1) may utilize bi-modal bleed valve assembly 20 to selectively vent a GTE compressor (e.g., compressor 40 shown in FIG. 1) and thereby regulate the air pressure therein.

It should thus be appreciated that there has been provided an exemplary embodiment of a bleed valve assembly that is operable in a servo-controlled mode or an autonomous mode. Notably, in the above-described exemplary embodiment, the bleed valve assembly normally resides in the autonomous mode and permits a user to activate the servo-controlled mode in a relatively simple and intuitive manner; i.e., by the insertion of a fitting into a control servo port.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A bi-modal bleed valve assembly operable in a servo-controlled mode and in an autonomous mode, the bi-modal bleed valve assembly comprising:
   a housing assembly having a bleed inlet, a bleed outlet, a control servo port, and a control chamber therein;
   a main flow control valve fluidly coupled to the control chamber and configured to move between an open position and a closed position to regulate fluid flow from the bleed inlet to the bleed outlet, the main flow control valve configured to move from an open position to a closed position when the pressure within the control chamber surpasses a predetermined pressure threshold; and
   a switching valve fluidly coupled between the bleed inlet, the servo control port, and the control chamber, the switching valve configured to route fluid flow into the control chamber from: (i) the bleed inlet in the autonomous mode, and (ii) the servo control port in the servo-controlled mode.

2. A bi-modal bleed valve assembly according to claim 1 wherein bi-modal bleed valve assembly is configured to be utilized in conjunction with a fitting, and wherein the control servo port is configured to receive the fitting therein.

3. A bi-modal bleed valve assembly according to claim 2 wherein the bi-modal bleed valve assembly is configured to transition from the autonomous mode to the servo-controlled mode when the fitting is received by the control servo port.

4. A bi-modal bleed valve assembly according to claim 2 wherein the switching valve is movable between: (i) a first seated position wherein the switching valve routes fluid flow from the control servo port to the control chamber, and (ii) a second seated position wherein the switching valve routes fluid flow from the bleed inlet to the control chamber.

5. A bi-modal bleed valve assembly according to claim 4 wherein the switching valve is configured to be maintained in the first seated position by the fitting when the fitting is received by the control servo port.

6. A bi-modal bleed valve assembly according to claim 5 wherein the switching valve resides adjacent the control servo port and contacts the fitting when the fitting is received by the control servo port.

7. A bi-modal bleed valve assembly according to claim 4 wherein the switching valve normally resides in the first seated position and is configured to transition from the first seated position toward the second seated position at a first predetermined pressure differential in the autonomous mode.

8. A bi-modal bleed valve assembly according to claim 4 wherein the switching valve moves toward the control servo port when transitioning from the first seated position to the second seated position.

9. A bi-modal bleed valve assembly according to claim 1 wherein the main flow control valve comprises a piston, the piston comprising:
   a poppet head; and
   a flange fixedly coupled to the poppet head, the piston slidably mounted within the housing assembly for movement between: (i) an open position wherein the poppet head substantially permits fluid flow from the bleed inlet to the bleed outlet, and (ii) a closed position wherein the poppet head substantially blocks fluid flow from the bleed inlet to the bleed outlet.

10. A bi-modal bleed valve assembly according to claim 9 wherein the flange cooperates with the housing assembly to generally define the control chamber.

11. A bi-modal bleed valve assembly according to claim 9 wherein the main flow control valve further comprises a spring biasing the piston toward the open position.

12. A bi-modal bleed valve assembly according to claim 11 wherein the flange includes a first radial face, the fluid within the control chamber acting on the first radial face of the flange in opposition to the spring.

13. A bi-modal bleed valve assembly according to claim 12 wherein the surface area of the first radial face is greater than the surface area of the poppet head exposed through the bleed inlet when the piston is in the closed position.

14. A bi-modal bleed valve assembly according to claim 9 wherein the piston further comprises a longitudinal channel therethrough fluidly coupling the bleed inlet to the switching valve.

15. A bi-modal bleed valve assembly operable in a servo-controlled mode and in an autonomous mode, the bi-modal bleed valve assembly to be fluidly coupled to a control servo utilizing a fitting in the servo-controlled mode, the bi-modal bleed valve assembly comprising:
   a housing assembly having a bleed inlet, a bleed outlet, a control servo port, and a control chamber therein;
   a main flow control valve fluidly coupled to the control chamber and configured to move between an open position and a closed position to regulate fluid flow from the bleed inlet to the bleed outlet, the main flow control valve configured to move from an open position to a closed position when the pressure within the control chamber surpasses a predetermined pressure threshold; and a switching valve disposed within the housing assembly, the switching valve routing fluid flow from the control servo port to the control chamber in a first seated position and from the bleed inlet to the control chamber in a second seated position, the switching valve configured: (i) to transition from first seated position to the second seated position at a first predetermined pressure differential in the autonomous mode, and (ii) to be maintained in the first seated position by the fitting in the servo-controlled mode.

16. A bi-modal bleed valve assembly operable in a servo-controlled mode and in an autonomous mode, the bi-modal bleed valve assembly to be fluidly coupled to a control servo utilizing a fitting in the servo-controlled mode, the bi-modal bleed valve assembly comprising:

a housing assembly having a bleed inlet, a bleed outlet, and a control servo port configured to receive the fitting therein in the servo-controlled mode;

a piston slidably disposed within the housing assembly and movable between an open position and a closed position, the piston generally preventing fluid flow from the bleed inlet to the bleed outlet in the closed position;

a control chamber generally defined by the housing assembly and the piston, the fluid pressure within the control chamber acting on the piston to control the translational position thereof; and a switching valve disposed within the housing assembly, the switching valve routing fluid flow from the control servo port to the control chamber in a first seated position and from the bleed inlet to the control chamber in a second seated position, the switching valve configured: (i) to transition from first seated position to the second seated position at a first predetermined pressure differential in the autonomous mode, and (ii) to be maintained in the first seated position by the fitting in the servo-controlled mode.

17. A bi-modal bleed valve assembly according to claim 16 further comprising a channel provided through the piston, the channel fluidly coupling the bleed inlet to the switching valve.

18. A bi-modal bleed valve assembly according to claim 16 wherein the piston comprises a radial flange having first and second opposing faces, the first face of the radial flange acted on by the fluid within the control chamber.

19. A bi-modal bleed valve assembly according to claim 18 further comprising a spring compressed between an inner wall of the housing assembly and the second face of the piston.

20. A bi-modal bleed valve assembly according to claim 16 wherein the switching valve further comprises a compliant element configured to be compressed by the fitting when the fitting is received by the control servo port in the servo-controlled mode.

* * * * *